WITNESSES:
*N. F. Susser*
*W. R. Crout*

INVENTORS
John B. MacNeill, Winthrop M. Leeds
and Benjamin P. Baker.
BY
*Ralph H. Swingle*
ATTORNEY WITNESSES:
H. F. Susser.
W. R. Crout INVENTORS
John B. MacNeill, Winthrop M. Leeds
and Benjamin P. Baker.
BY
Ralph H. Swingle
ATTORNEY WITNESSES:
N. F. Susser.
W. R. Crout INVENTORS
John B. MacNeill, Winthrop M. Leeds
and Benjamin P. Baker.
BY
Ralph H Swingle
ATTORNEY WITNESSES:
H. F. Susser
W. R. Crout INVENTORS
John B. MacNeill, Winthrop M. Leeds
and Benjamin P. Baker.
BY
Ralph H Swingle
ATTORNEY Feb. 16, 1954 J. B. MacNEILL ET AL 2,669,629

CIRCUIT INTERRUPTER

Filed July 22, 1950 6 Sheets-Sheet 5

WITNESSES:

H. F. Susser.

W. R. Crout

INVENTORS
John B. MacNeill, Winthrop M. Leeds
and Benjamin P. Baker.
BY
Ralph H Swingle
ATTORNEY Feb. 16, 1954

J. B. MacNEILL ET AL 2,669,629

CIRCUIT INTERRUPTER

Filed July 22, 1950

6 Sheets-Sheet 6

WITNESSES:

H. F. Susser.

W. R. Crout

INVENTORS

John B. MacNeill, Winthrop M. Leeds. and Benjamin P. Baker.

BY

Ralph H Swingle

ATTORNEY

Patented Feb. 16, 1954

2,669,629

UNITED STATES PATENT OFFICE 2,669,629

CIRCUIT INTERRUPTER

John B. MacNeill and Winthrop M. Leeds, Pittsburgh, and Benjamin P. Baker, Turtle Creek, Pa., assignors to Westinghouse Electric Corporation, East Pittsburgh, Pa., a corporation of Pennsylvania Application July 22, 1950, Serial No. 175,375

21 Claims. (Cl. 200—150)

This invention relates to circuit interrupters, in general, and more particularly to improved operating mechanisms and improved interrupting structures therefor.

A general object of our invention is to provide an improved circuit interrupter which will more effectively interrupt the circuit therethrough than has heretofore been achieved.

Another object is to provide a circuit interrupter having an improved contact operating sequence and an improved isolating switch arrangement.

Still a further object is to provide an improved high-speed operating mechanism for a circuit interrupter of the foregoing type.

Another object is to associate in a liquid break type of circuit interrupter, a liquid moving piston, particularly effective during low current interruption, and to provide an improved high-speed operating mechanism for the interrupter and also for causing the charging motion of the piston.

Another object is to provide an improved liquid break type of circuit interrupter in which the volume of liquid utilized is at a minimum, resulting in the so-called oil-poor construction, in which an improved interrupter and mechanism arrangement is provided to result in high-speed, simple and trouble-free performance.

A subsidiary object is to provide an improved operating leverage system for effectively and rapidly actuating the foregoing structure.

Another object is to provide an improved resilient intermediate contact for a circuit interrupter of the type having two movable contacts separating in substantially opposite directions from an intermediate contact to thereby establish two serially related arcs.

Further objects and advantages will readily become apparent upon reading the following specification, taken in conjunction with the drawings, in which.

Figure 1:
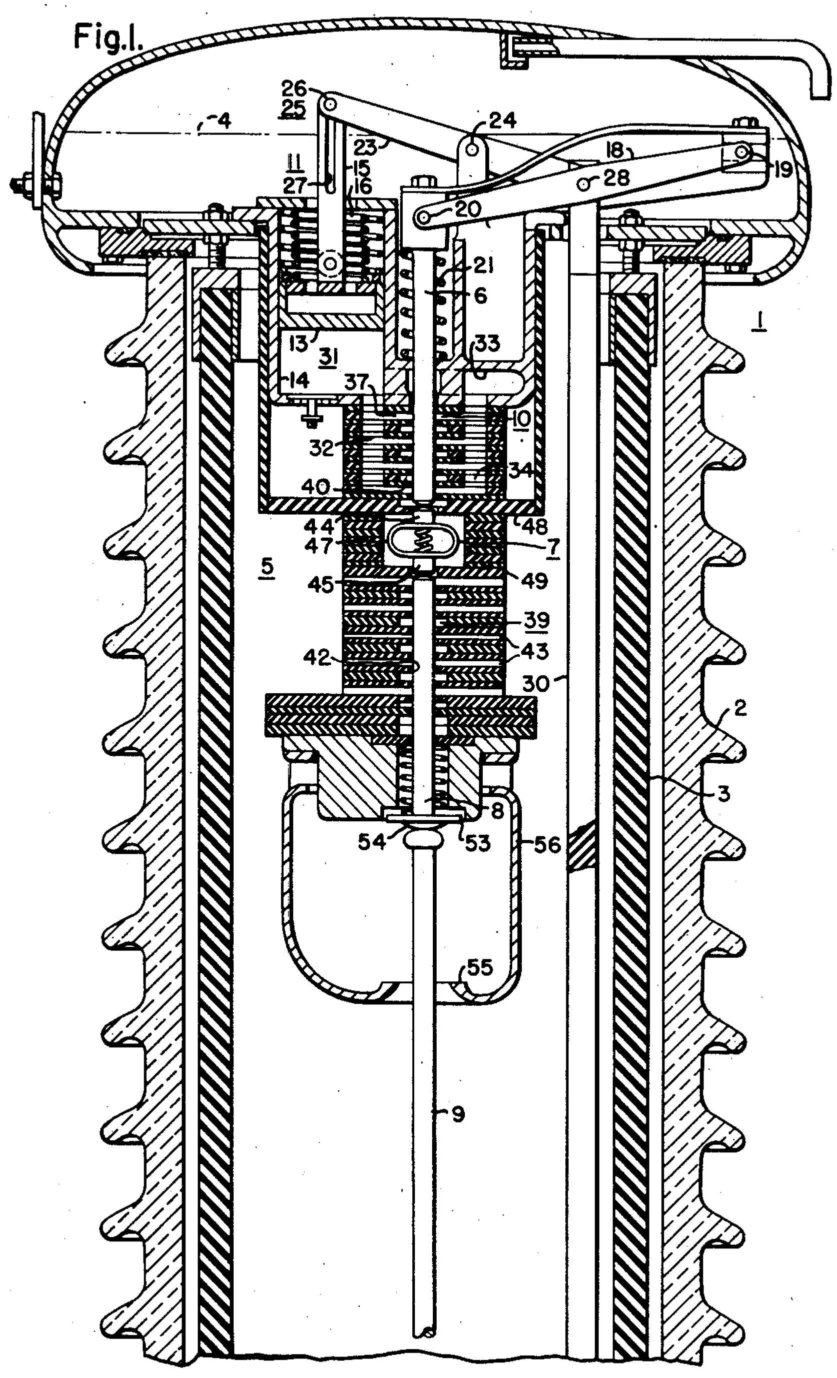
Figure 1 is a fragmentary vertical sectional view taken through the interrupting part of a circuit interrupter embodying our principles, and shown in the closed circuit position.
Figure 2:
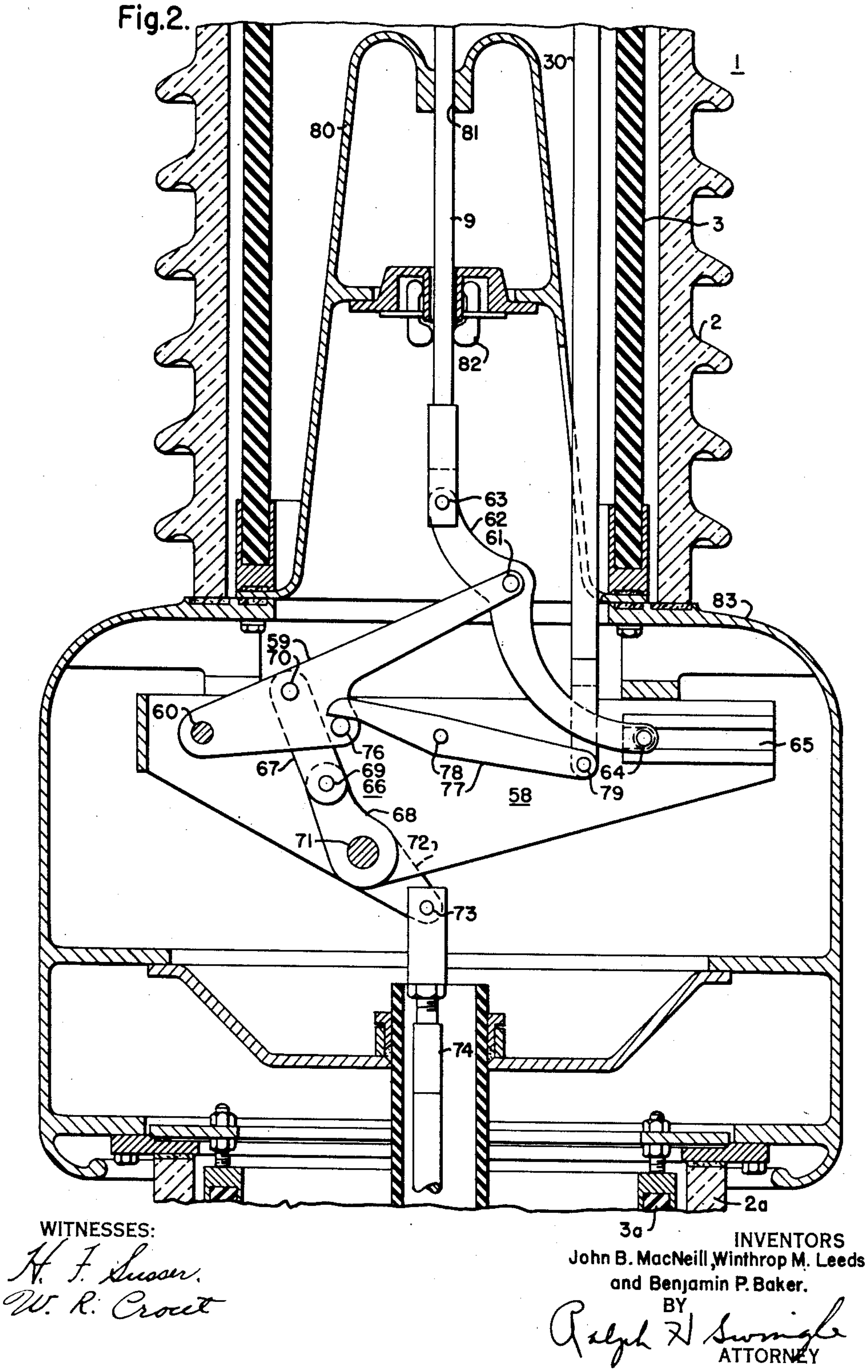
Fig. 2 is a fragmentary vertical sectional view of the lower portion of the interrupter of Fig. 1, the operating mechanism therefore being shown in the closed circuit position.
Figure 5:
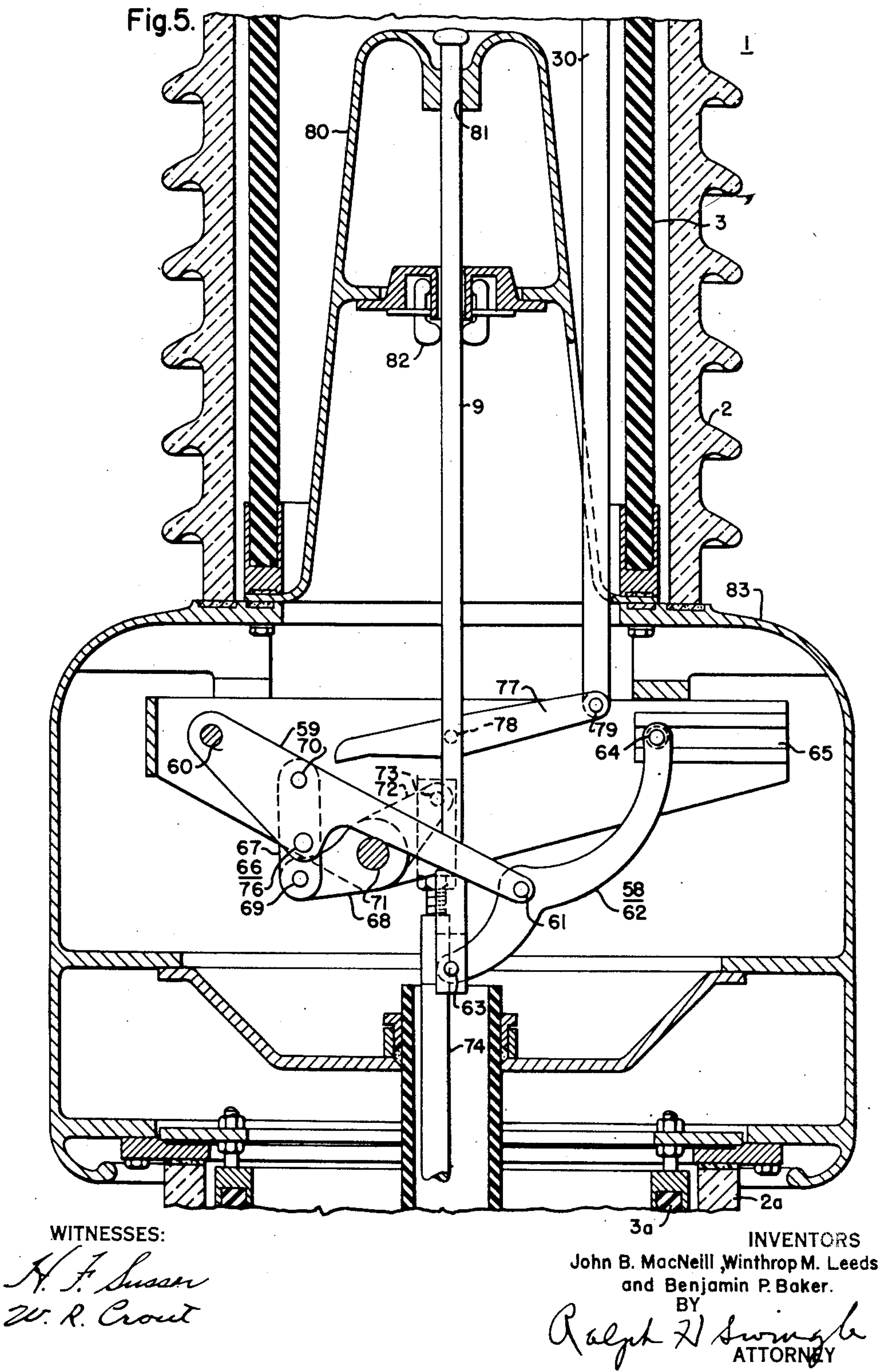
Fig. 5 is a view corresponding with that of Fig. 2, but showing the disposition of the isolating contact and also of the operating linkage in the fully open circuit position of the interrupter.

Referring to the drawings, and more particularly to Figs. 1 and 2 thereof, the reference numeral 1 designates generally a circuit interrupter of the so-called liquid-poor type, that is one utilizing a minimum volume of liquid, such as circuit breaker oil. As shown, the interrupter 1 includes an outer cylindrical weather-proof casing 2, consisting of a suitable ceramic material, such as porcelain or the like, under compression, and an interiorly disposed insulating cylinder 3, preferably placed under tension. The inner casing 3 contains a suitable arc extinguishing fluid, such as oil, filled to the level 4. Within the inner cylindrical casing 3 is disposed an arc extinguishing unit, generally designated by the reference character 5 and including an upwardly movable pressure-generating rod-shaped contact 6, an intermediate contact 7 and a lower movable interrupting contact 8. Cooperating with the lower end of the interrupting contact 8 is a movable rod-shaped disconnect contact 9, which, in the open circuit position of the interrupter, as shown in Fig. 5, provides a disconnect gap in the circuit.

Associated with the pressure-generating arc passage 10 is a piston structure generally designated by the reference character 11, and including a movable piston 13, movable in an operating cylinder 14 and having a slotted piston rod 15 connected thereto. The piston 13 is biased downwardly in a working direction by a battery of compression springs 16, which are charged, or compressed, during the closing operation of the interrupter, as will be explained more fully hereinafter.

Preferably we provide an operating lever 18 pivotally mounted at its right-hand end at a pivot 19 guided to move horizontally, and having its left-hand end pivotally connected, as at 20, to the upper end of the movable pressure-generating contact 6. It will be observed that the pressure-generating contact 6 is biased upwardly in a circuit opening direction by a compression spring 21.

An actuating lever 23 is also provided, being pivotally mounted, intermediate the end thereof, at a stationary pivot 24. The left-hand end of the actuating lever 23 is connected, by a lost-motion connection 25, to the upper end of the piston rod 15. More specifically, this lost-motion connection 25 includes a pin 26 secured to the left-hand end of the actuating lever 23, said pin 26 moving vertically within an elongated slot 27 provided at the upper end of the piston rod 15. Consequently, during the closing operation of the interrupter, when the actuating lever 23 rotates in a clockwise direction about the stationary pivot 24, the pin 26 causes upward or charging motion of the piston 13 in opposition to the biasing action exerted by the battery of compression springs 16. During the opening operation, as will be more fully explained hereinafter, the contact structure is free to open independently of operation of the piston 13 by virtue of the presence of the lost-motion connection 25.

The right-hand end of the actuating lever 23 is pivotally connected, as at 28, to both an intermediate point of the operating lever 18 and also to the upper end of an insulating operating rod 30.

As shown in the drawing, the piston chamber 31 is connected hydraulically to the pressure-generating arc passage 10 by a vertical conduit 32, formed upon the alignment of holes provided in suitably configured plates, and also by a conduit 33, hydraulically connected to a second vertical conduit 34 likewise formed by a registration of holes provided in the plate structure.

The pressure-generating chamber or passage 10 is formed by the use of a plurality of apertured insulating plates, disposed in contiguous relationship and causing the pressure-generating arc 35 (Fig. 3) to be drawn through a plurality of orifices 36, provided by suitable holes formed in the plate structure. Inlet passages 37 interconnect the vertical conduits 34, 32 with the arc passage 10 so that, during low current interruption, the piston 13 may force liquid, such as oil, through the conduit 32 and also through the conduits 33, 34 and through the plurality of pairs of inlet passages 37 toward the pressure-generating arc 35.

After intimately contacting the pressure-generating arc 35 by a passage of the oil through the plurality of orifices 36, the liquid then passes downwardly through two vertically disposed conduits, not shown, interconnecting the pressure-generating chamber 10 with the interrupting chamber 39. In other words, a plurality of pairs of vent passages 40 are provided intermediate the orifices 36 which permit the passage of oil to flow downwardly through the two previously mentioned vertical conduits, not shown, and into the interrupting chamber 39 to strike the interrupting arc 41 (Fig. 3) established between the intermediate contact 7 and the lower movable interrupting contact 8.

After passing through a plurality of pairs of inlet passages, not shown, leading into the interrupting chamber 39, the oil passes through a plurality of orifices 42 to exhaust out of the unit 5 through oppositely disposed vent passages 43.

The particular plate arrangement is not a part of our invention, and consequently it is only briefly described. Reference may be had to United States Patent 2,445,442, issued July 20, 1948, to Winthrop M. Leeds and Robert E. Friedrich. Also reference may be had to United States patent application filed April 16, 1947, Serial No. 741,865, now United States Patent 2,530,952, issued November 21, 1950 to Francis J. Fry and assigned to the assignee of the instant application.

During the interruption of relatively high currents, the pressure generated at the pressure-generating arc 35 is adequate for speedy interruption of the interrupting arc 41, and in such a case, the pressure may be so high within the pressure-generating arc passage 10 as to act back through the conduits 32, 34 and stall downward motion of the piston 13. After arc interruption, however, the pressure falls and the piston completes its stroke, sending a flushing flow of oil through the arcing chambers. It is only during the interruption of relatively low amperage currents, when the pressure generated at the pressure-generating arc 35 is low, that the piston 13 is free to move downwardly, as caused by the battery of compression springs 16, to force oil into the pressure-generating passage or chamber 10 and subsequently downwardly into the interrupting chamber 39 to effect extinction of the interrupting arc 41 established therein.

Figure 3:
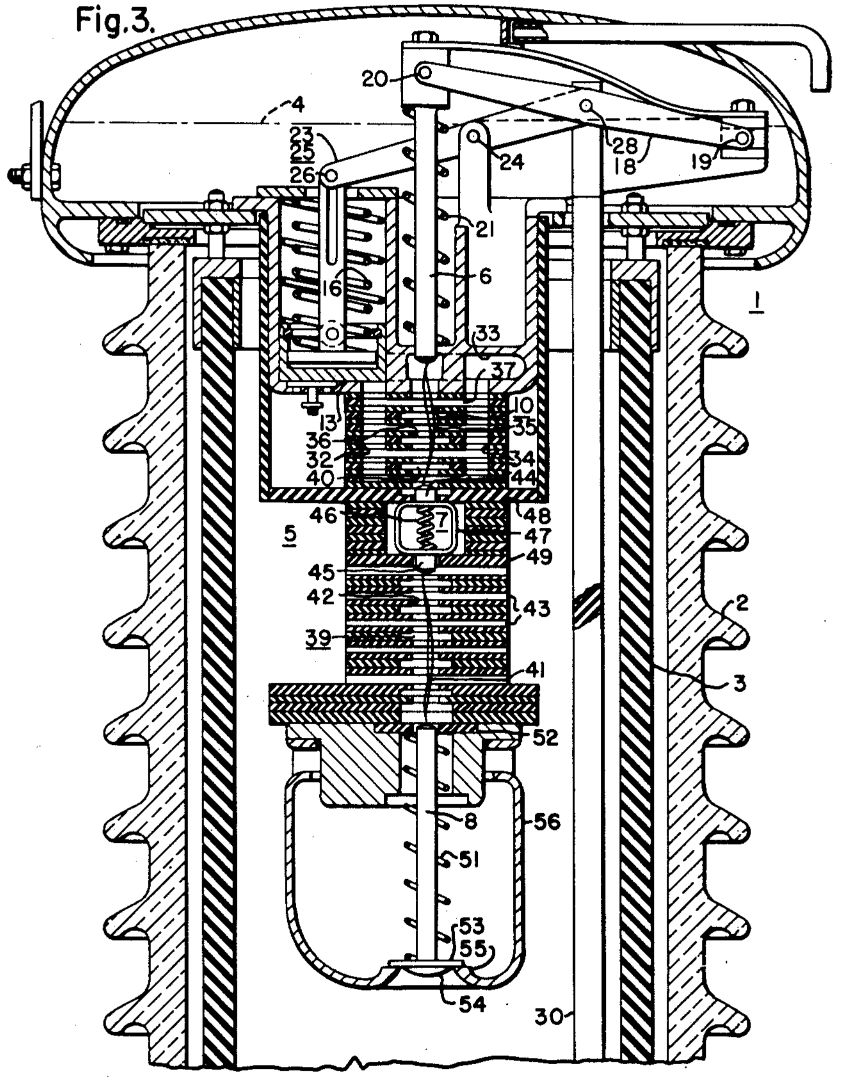
Fig. 3 is a view corresponding with that of Fig. 1, but the disposition of the several parts being shown in the fully open circuit position of the interrupter.

Although the arcs 35, 41, have been drawn in Fig. 3 for purposes of description, nevertheless, in fact, when the contact structure has reached the position shown in Fig. 3, the arcs 35, 41, will, at this time, have been extinguished.

Figure 4:
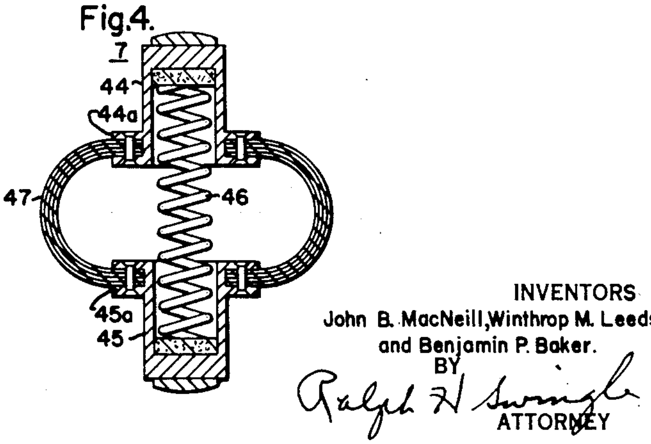
Fig. 4 is an enlarged vertical sectional view through our improved intermediate contact arrangement.

Referring to Fig. 4, which shows more clearly the intermediate contact structure 7, it will be apparent that we have provided two electrically interconnected contacts 44, 45 of cup-shaped configuration, which serve as seats for a compression spring 46, which provides resilient contact pressure between the contacts 6, 44 and 8, 45. A pair of flexible straps 47 are employed to electrically interconnect the contacts 44, 45 in series. The straps 47 are riveted to flanges *44a*, *45a*, respectively, of contacts 44, 45. The flanges *44a*, *45a* serve as stops to limit extension of the intermediate contact 7, the flange *44a* striking a plate 48, and the lower flange *45a* striking a plate 49. As mentioned, the provision of compression spring 46 provides contact pressure between the several pairs of contacts immediately adjacent to the point of actual contact so that there is no need for supplying resilience elsewhere in the operating leverage system.

It will be observed that the lower movable contact 8 is biased downwardly, in a circuit-opening direction, by a compression spring 51, the latter being seated between a plate 52 and a flange 53 secured to the lower end of the movable interrupting contact 8. Immediately below the flange 53 is a contact portion 54, which serves, in effect, as a relatively stationary disconnect contact cooperating with the movable disconnect contact 9 to establish an isolating gap, in the fully open circuit position of the interrupter, as shown in Figs. 3 and 5.

To limit the downward travel of the movable interrupting contact 8, the flange 53 strikes a stop portion 55 provided by a lower electrostatic shield 56.

Referring to Figs. 2 and 5, which respectively show the closed and open circuit positions of the operating parts, it will be observed that we have provided an operating leverage system, generally designated by the reference numeral 58, and including an operating lever 59, fixedly mounted adjacent its left-hand end, as viewed in Figs. 2 and 5, to a stationary pivot 60.

The right-hand end of the operating lever 59 is pivotally connected, as at 61, to a guide link 62, one end of which is pivotally connected, as at 63, to the lower end of the movable disconnect contact 9, and the other end of which is guided by a roller 64 rolling in a horizontal race track 65. By the proper proportioning of these links and levers, the pin 63, to which contact 9 is attached, will be constrained to move in a substantially straight line by principles well known in the art.

To cause opening and closing motion of the operating lever 59, we provide a toggle, generally designated by the reference character 66, and including a toggle link 67 and a second toggle link 68. A knee pin 69 interconnects the toggle links 67, 68. The upper end of the toggle link 67 is pivotally connected, as at 70, to the operating lever 59 intermediate the ends thereof. The lower toggle link 68 is fixed to a rotatable shaft 71, having a crank arm 72 which is pivotally connected, at 73, to the upper end of a pull rod 74. Thus, downward closing motion of the pull rod 74 causes clockwise rotation of the shaft 71 and hence straightening of the toggle 66 to effect thereby counterclockwise rotation of the operating lever 59 about the pivot 60, to effect upward closing motion of the disconnect contact 9. Opening operation, which is achieved by upward motion of the pull rod 74, permits the toggle 66, which is almost on-center in the closed position of the interrupter, to break, and to permit, upon collapse, clockwise rotation of the operating lever 59 and hence downward or opening motion of the movable disconnect contact 9.

A pin 76, secured to and movable with the operating lever 59, engages near the end of the closing stroke, the left-hand end of an actuating lever 77, the latter being stationarily pivoted at 78 intermediate the ends thereof. The right-hand end of the actuating lever 77 is pivotally connected, as at 79, to the lower end of the operating rod 30. As previously described, downward motion of the operating rod 30 effects charging of the piston structure 11 and also closing motion of the upper pressure-generating contact 6.

Preferably, the movable disconnect contact 9 is guided by an electrostatic shield member 80, as at 81, and also contact fingers 82 are provided, which bear against the sides of the movable disconnect contact 9. It will be observed that the casing 2 is supported upon a metallic housing 83 which encloses the operating leverage system 58. The housing 83 is, in turn, supported upon a lower casing *2a* of weatherproof material, which may be similar to the upper casing 2. Likewise, an inner insulating cylinder *3a* may be provided, interiorly of the casing *2a*, being placed under tension so that the lower ceramic casing *2a* will be under compression.

The lower end of the casing *2a* and the inner insulating cylinder *3a* is supported upon a suitable base framework, not shown, but which is conventional in the art. If desired, a second interrupter 1 may be mounted upon the same base framework, and the two interrupters electrically connected in series so that twice the voltage may be interrupted.

The opening operation of the interrupter will now be explained: During the opening operation, the pull rod 74 is moved upwardly, to thereby break the toggle 66, permittng collapse of the same to thereby cause clockwise rotation of the operating lever 59. Also the clockwise rotation of the operating lever 59 allows the pin 76 to permit the actuating lever 77 to rotate in a counterclockwise direction about the stationary pivot 78 to permit the springs 18, 21 to effect working motion of the piston 13 (assuming the pressure is low) and upward opening travel of the movable pressure-generating contact 6.

During this time, the clockwise rotation of the operating lever 59 has caused the guide link 62 to pull the movable disconnect contact 9 downwardly, thereby permitting the compression spring 51 to cause downward opening motion of the interrupting contact 8. It will be noted that the lower end 53 of the interrupting contact 8 remains in abutting engagement with the upper end of the movable disconnect contact 9 until the latter passes below the electrostatic shield 56, at which time the continued downward lowering motion of the movable interrupting contact 8 is halted by the flange 53 striking the stop portion 55 of the electrostatic shield 56.

During the opening of the contact structure, the pressure-generating arc 35 has been established between the contacts 7, 6, and an interrupting arc has been established between the intermediate contact 7 and the interrupting contact 8. Fluid flow, in the manner previously described, effects extinction of the interrupting arc 41, so that the circuit is broken, and continued downward travel of the movable disconnect contact 9 inserts an isolating or disconnect gap in the circuit, as shown in Fig. 5. Fig. 5, consequently, shows the disposition of the leverage system 58 in the fully open circuit position of the interrupter.

The closing operation of the interrupter will now be explained: To close the interrupter, the pull rod 74 is forcibly pulled downwardly. This causes straightening of the toggle 66 to thereby effect counterclockwise rotation of the operating lever 59, about the pivot 60, to thereby effect upward closing motion of the movable disconnect contact 9, as caused by closing motion of the guide link 62.

Near the end of the closing operation, when the toggle 66 is in a favorable position to give a substantial mechanical advantage to the pull on rod 74 with respect to the applied loads, at this time, the pin 76, secured to and movable with the operating lever 59, strikes the left-hand end of the actuating lever 77 and forcibly causes clockwise rotation of the same. The clockwise rotation of the actuating lever 77 forcibly pulls the insulating operating rod 30 downwardly, to effect thereby closing motion of the pressure-generating contact 6 against the biasing action exerted by the compression spring 21, and also effects upward charging motion of the piston 13 in opposition to the biasing action exerted by the compression springs 16.

Substantially simultaneously with closing of the contacts 6, 7, the interrupting contact 8 strikes the intermediate contact 7, having previously been engaged and moved upwardly by the lower movable disconnect contact 9. As a result, there is a practically simultaneous closing of both the pressure-generating contacts 7, 6 with the interrupting contacts 7, 8. The circuit is then closed through the interrupter 1, and the toggle 66 is brought close to its on-center position, while the operating mechanism (not shown) is latched.

Figure 6:
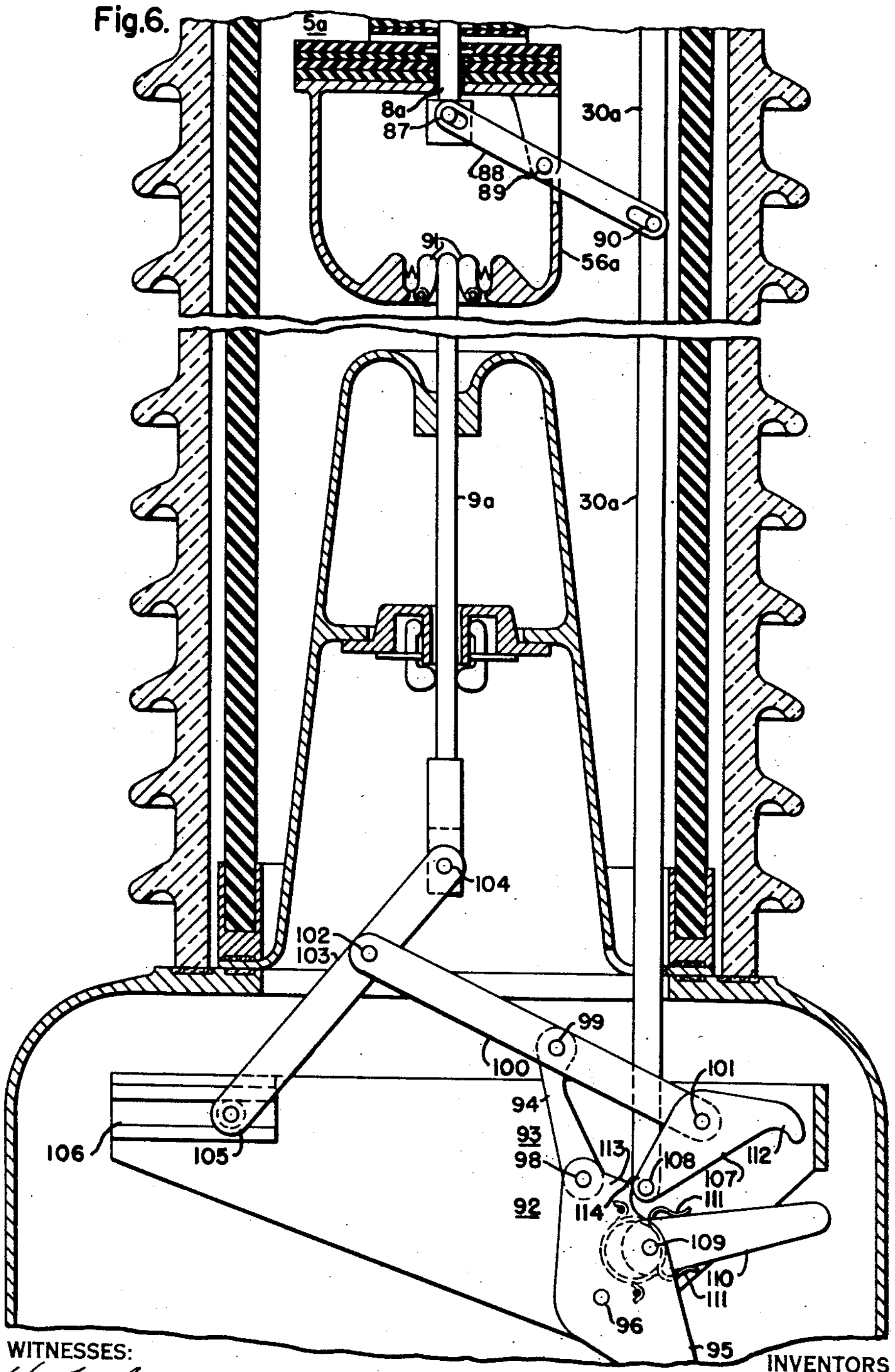
Fig. 6 is a fragmentary vertical sectional view taken through a modified type of interrupter, embodying the principles of our invention and shown in the closed circuit position.
Figure 7:
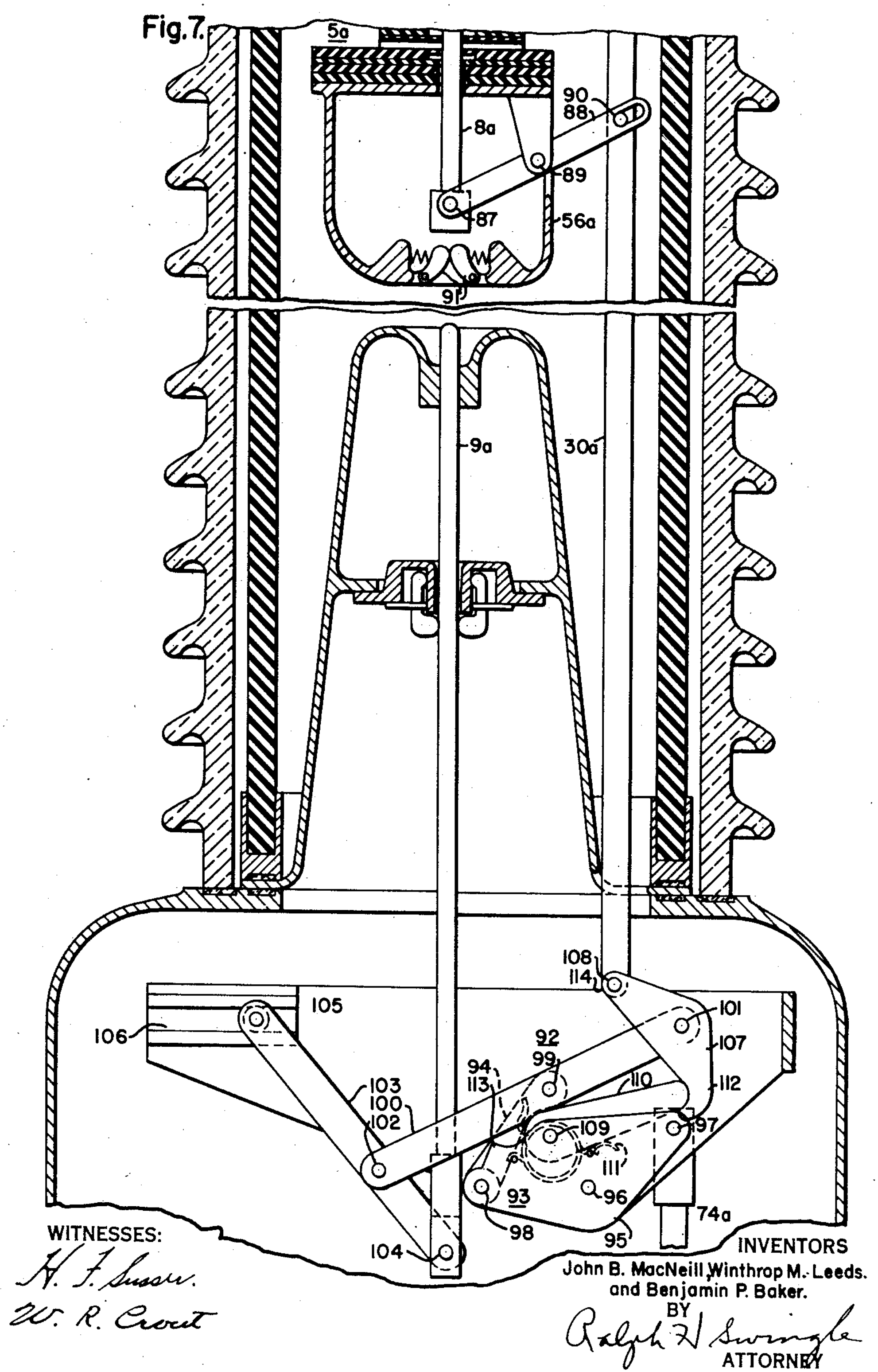
Fig. 7 is a view corresponding with that of Fig. 6, but indicating the disposition of several parts in the fully open circuit position of the interrupter.

Figs. 6 and 7 illustrate a modification of our invention in which, although the arc extinguishing unit *5a* is practically the same as it was in Figs. 1 and 3, certain significant changes have been made. For instance, the lower movable interrupting contact *8a* is pivotally connected, at 87, to an operating lever 88, pivoted at 89 to a stationary pivot. The right-hand end of the operating lever 88 is pivotally connected, at 90, to the operating rod 30a. The stationary pivot 89, supporting the operating lever 88, is provided by an electrostatic shield member 56a, which, at the lower end thereof, is provided with a pair of finger contacts 91, which bear against the sides of the lower movable disconnect contact rod 9a. This arrangement increases the speed of the lower contact 8a with respect to the operating rod 30a.

We further provide a modified type of leverage system, generally designated by the reference numeral 92, and including a toggle 93, comprising a toggle link 94 and a toggle plate 95 stationarily pivoted at a fixed pivot 96. A pull rod 74a is pivotally connected, as at 97, to the toggle plate 95. A knee pin 98 pivotally interconnects the toggle links 94, 95. The upper end of the toggle link 94 is pivotally connected, as at 99, to an operating lever 100, the right-hand end of which is pivotally connected, at 101, to a stationary pivot.

The left-hand end of the operating lever 100 is pivotally connected, as at 102, to an actuating link 103, the upper end of which (Fig. 6) is pivotally connected, as at 104, to the lower end of the movable disconnect contact rod 9a. The left-hand end of the actuating link 103, as viewed in Figs. 6 and 7, is guided by a roller 105 moving in a horizontal race track 106.

Also pivotally connected to the stationary pivot 101 is a rotatable actuating plate or member 107 pivotally connected, as at 108, to the lower end of the operating rod 30a.

Pivotally connected to the toggle plate 95, as at 109, is an actuating lever 110, which is biased to the position shown in Fig. 6, by suitable leaf springs 111, the purpose for which will be more fully apparent hereinafter.

During the closing operation of the interrupter, starting from the position shown in Fig. 7, the pull rod 74a is forcibly moved downwardly. This causes clockwise rotation of the toggle plate 95 about the stationary pivot 96, to effect thereby straightening of the toggle 93. Also the actuating lever 110, which is engaged with a hooked portion 112 of the plate member 107, forcibly causes counterclockwise rotation of the plate member 107 about the stationary pivot 101, to effect thereby downward closing motion of the operating rod 30a. Near the end of the closing operation, an actuating portion 113 of toggle plate 95 engages a portion 114 of the plate member 107 to continue the counterclockwise rotation of the plate member 107 about the stationary pivot 101, thereby effecting release of the actuating lever 110 from the portion 112 of the plate member 107. Thus, in the fully closed circuit position of the interrupter, as shown in Fig. 6, the actuating lever 110 is free from the plate member 107, and the actuating portions 113, 114 of the plates 95, 107, respectively, prevent upward opening motion of the operating rod 30a.

It will be observed that during the closing operation, the contact structure, including the contacts 6, 8a, have effected engagement prior to engagement of the upper end of the movable disconnect contact 9a with the finger contacts 91, so that the circuit is closed only at the contacts 9a, 91 and not at the contacts disposed within the unit 5a. Thus, any contamination due to prestriking on the closing stroke will occur in clear liquid outside of the unit 5a, and not within the unit 5a. If such contamination were to take place within the unit 5a during the closing operation, instead of between the fingers 91 and the movable disconnect contact 9a in relatively clean oil, then the dielectric strength within the unit 5a would be lowered for a subsequent opening operation. Such a lowering of dielectric strength would tend to cause prolonging of the arcing period during such a subsequent opening operation.

An opening operation of the modified type of interrupter shown in Figs. 6 and 7 will now be described: Assuming the interrupter to be closed, as shown in Fig. 6, and that it is desired to effect an opening operation, suitable mechanism not shown, is actuated to cause upward opening movement of the pull rod 74a. Practically immediately thereafter the actuating portions 113, 114 separate so that immediately the operating rod 30a is free to move upwardly due to the biasing action exerted by the springs 16, 21 to effect opening of the contact structure and operation of the piston structure 11, entirely independently of opening operation of the toggle 93 and related mechanism effecting opening operation of the movable disconnect contact 9a.

From the foregoing it will be seen that opening operation of the movable disconnect contact 9a is independent of opening of the contact structure within the unit 5a. As the pull rod 74a continues to move upwardly thereby effecting continued collapse of the toggle 93, the operating lever 100 moves in a counterclockwise direction about the fixed pivot 101 causing substantially clockwise rotation of the actuating link 103 about the horizontally moving pivot 105 as a center, thereby effecting downward opening motion of the movable disconnect contact rod 9a. By the time that the movable disconnect contact 9a separates from the contact fingers 91, the arcs 35, 41 within the unit 5a will have been extinguished, and the circuit consequently interrupted. Continued upward travel of the pull rod 74a finally effects a separation between the finger contacts 91 and the movable disconnect contact 9a to effect an isolating gap within the circuit in the fully open circuit position of the interrupter, as shown in Fig. 7. As the linkage approaches its final position, link 110 snaps into engagement with the hooked end 112 of the plate member 107 ready for the next closing operation.

From the foregoing two embodiments of our invention, it will be apparent that we have provided an improved interrupting structure utilizing a single arc extinguishing unit with an improved piston arrangement in a liquid-poor construction. Since there is simultaneous contact separation and contact closure in both embodiments, the arrangement is particularly suitable for three cycle interrupting times at voltages of 115 kv. and above. As mentioned, two such column type interrupting structures 1 may be used in series to double the voltage which can be interrupted.

It will moreover be apparent that the operating mechanism is simple and efficient. It will be noted that with the first arrangement disclosed, as set forth in Figs. 1–5, the lower grid contact 8 is operated directly by the long stroke disconnect contact 9, while the upper contact 6 is operated by the insulated rod 30. Moreover, in the first arrangement, this insulated rod 30 operates in tension and is moved only in the latter part of the breaker closing stroke, when the toggle levers 67, 68 are in an advantageous position. The resilient intermediate contact 7 gives contact pressure close to the contact surfaces, and avoids resilient joints in the linkages.

In the second arrangement, shown in Figs. 6 and 7, the isolating contact 9a has no mechanical connection whatsoever with the interrupting contacts, and, therefore, can be made of very light construction. Also during the closing operation, the interrupter contacts are closed first and the circuit finally established at the isolating contacts 9a, 91. During the opening stroke, in the second arrangement, the initial motion of the operating mechanism 92 releases the interrupter contacts, so that their opening speed is entirely independent of the speed of the isolating contact 9a and its associated mechanism.

It will also be noted in the second arrangement, that the closing load is very uniform, in that the interrupter contacts and piston pumping mechanism are moved during a large portion of the closing stroke. This is in contrast to that of the first arrangement where the interrupter contacts and piston are charged only at the end of the closing stroke. Each arrangement has its advantages in certain situations.

Although we have shown and described particular structures, it is to be clearly understood that the same were merely for the purpose of illustration, and that changes and modifications may readily be made therein by those skilled in the art, without departing from the spirit and scope of the appended claims.

We claim as our invention:

1. A circuit interrupter including an arc extinguishing unit, a movable contact movable adjacent one end of the unit, an operating rod for actuating said contact movable longitudinally of the unit, a movable disconnect contact movable adjacent the other end of the unit, an operating mechanism including a rotatable operating lever, the operating lever being rotatable about a substantially fixed pivot adjacent one end thereof, means connecting the movable disconnect contact with the operating lever, an actuating lever, means connecting the operating rod with the actuating lever so as to constantly move therewith, means independent of the actuating lever for effecting motion of the operating lever, and a pin secured to and movable with the operating lever to cause rotation of the actuating lever during the closing operation.

2. A circuit interrupter including an arc extinguishing unit, a movable contact movable adjacent one end of the unit, an operating rod for actuating said contact movable longitudinally of the unit, a movable disconnect contact movable adjacent the other end of the unit, an operating mechanism including a rotatable operating lever, the operating lever being rotatable about a substantially fixed pivot adjacent one end thereof, means connecting the movable disconnect contact with the operating lever, an actuating lever, means connecting the operating rod with the actuating lever so as to constantly move therewith, a toggle linkage for rotating the operating lever, and a pin secured to and movable with the operating lever to rotate the actuating lever near the end of the closing operation when the toggle linkage is in a nearly expanded condition.

3. A circuit interrupter including an arc extinguishing unit, a movable contact movable adjacent one end of the unit, a movable contact movable adjacent the other end of the unit, an operating rod for actuating both movable contacts movable longitudinally of the unit, a movable disconnect contact movable adjacent said other end of the unit, an operating mechanism including a rotatable toggle plate, an operating lever, means interconnecting the movable disconnect contact with the operating lever, a toggle link cooperable with the toggle plate to effect rotation of the operating lever, a rotatable actuating plate, means connecting the operating rod with the actuating plate, and an actuating lever pivotally mounted upon the toggle plate to effect rotation of the actuating plate.

4. A circuit interrupter including an arc extinguishing unit, a movable contact movable adjacent one end of the unit, an operating rod for actuating said movable contact movable longitudinally of the unit, a movable disconnect contact movable adjacent the other end of the unit, an operating mechanism including a rotatable toggle plate, means interconnecting the movable disconnect contact with the toggle plate, a rotatable actuating plate, means connecting the operating rod with the actuating plate, and an actuating lever pivotally mounted upon the toggle plate to effect rotation of the actuating plate.

5. A circuit interrupter including an arc extinguishing unit, a movable contact movable adjacent one end of the unit, an operating rod for actuating said movable contact movable longitudinally of the unit, a movable disconnect contact movable adjacent the other end of the unit, an operating mechanism including a rotatable toggle plate, means interconnecting the movable disconnect contact with the toggle plate including a toggle link, a rotatable actuating plate, means connecting the operating rod with the actuating plate, and an actuating lever pivotally mounted upon the toggle plate to effect rotation of the actuating plate.

6. A circuit interrupter including an arc extinguishing unit, a movable contact movable adjacent one end of the unit, an operating rod for actuating said movable contact movable longitudinally of the unit, a movable disconnect contact movable adjacent the other end of the unit, an operating mechanism including a rotatable toggle plate, means interconnecting the movable disconnect contact with the toggle plate, a rotatable actuating plate, means connecting the operating rod with the actuating plate, an actuating lever pivotally mounted upon the toggle plate to effect rotation of the actuating plate, and an actuating portion provided on the toggle plate to engage an actuating portion of the actuating plate to effect release of the actuating lever from the actuating plate.

7. A circuit interrupter including an arc extinguishing unit, a movable contact movable adjacent one end of the unit, a movable contact movable adjacent the other end of the unit, an operating rod for actuating both movable contacts movable longitudinally of the unit, a movable disconnect contact movable adjacent said other end of the unit, an operating mechanism including a rotatable toggle plate, an operating lever, means interconnecting the movable disconnect contact with the operating lever, a toggle link cooperable with the toggle plate to effect rotation of the operating lever, a rotatable actuating plate, means connecting the operating rod with the actuating plate, an actuating lever pivotally mounted upon the toggle plate to effect rotation of the actuating plate, and an actuating portion provided on the toggle plate to engage an actuating portion of the actuating plate to effect release of the actuating lever from the actuating plate.

8. A circuit interrupter including an arc extinguishing unit, a movable contact movable adjacent one end of the unit, an operating rod for actuating said movable contact movable longitudinally of the unit, a movable disconnect contact movable adjacent the other end of the unit, an operating mechanism including a rotatable toggle plate, means interconnecting the movable disconnect contact with the toggle plate, a rotatable actuating plate pivoted intermediate the ends thereof, means connecting the operating rod with one end of the actuating plate, and an actuating lever pivotally mounted upon the toggle plate to engage the other end of the actuating plate.

9. A circuit interrupter including an arc extinguishing unit, a movable contact movable adjacent one end of the unit, an operating rod for actuating said movable contact movable longitudinally of the unit, a movable disconnect contact movable adjacent the other end of the unit, an operating mechanism including a rotatable toggle plate, means interconnecting the movable disconnect contact with the toggle plate, a rotatable actuating plate pivoted intermediate the ends thereof, means connecting the operating rod with one end of the actuating plate, an actuating lever pivotally mounted upon the toggle plate to engage the other end of the actuating plate, and an actuating portion provided on the toggle plate to engage an actuating portion of the actuating plate to effect release of the actuating lever from the actuating plate.

10. A circuit interrupter including an arc extinguishing unit, a movable contact movable adjacent one end of the unit, piston structure disposed adjacent said one end of the unit including a movable piston, means biasing the movable piston in a working direction, a piston rod, an operating lever pivotally mounted adjacent one end thereof to a substantially fixed pivot and connected to the movable contact adjacent the other end thereof, an actuating lever pivotally mounted intermediate the ends thereof to a substantially stationary pivot and connected adjacent one end thereof to the piston rod, an operating rod movable longitudinally of the unit, means interconnecting the operating rod with both the actuating lever adjacent the other end thereof and also to the operating lever intermediate the ends thereof so that when the operating rod is pulled in tension toward the other end of the arc extinguishing unit the movable contact is moved to the closed position and the movable piston is charged against the force of the biasing means.

11. A circuit interrupter including an arc-extinguishing unit, a movable contact movable adjacent one end of the unit, a relatively stationary intermediate contact, a second movable contact movable adjacent the other end of the unit, means biasing the said second movable contact away from the intermediate contact, a movable disconnecting contact movable adjacent said other end of the unit and carrying the second movable contact therewith during the closing operation against the biasing action exerted by said biasing means, the movable disconnecting contact separating away from the second movable contact during the opening operation to insert an isolating gap into the circuit, an operating rod for actuating the first said movable contact, and means for moving the operating rod in a direction longitudinally of the arc-extinguishing unit and toward the other end of the unit during the closing operation.

12. A circuit interrupter including an arc-extinguishing unit, a movable contact movable adjacent one end of the unit, a relatively stationary intermediate contact, a second movable contact movable adjacent the other end of the unit, means biasing the said second movable contact away from the intermediate contact, a movable disconnecting contact movable adjacent said other end of the unit and carrying the second movable contact therewith during the closing operation against the biasing action exerted by said biasing means, the movable disconnecting contact separating away from the second movable contact during the opening operation to insert an isolating gap into the circuit, lever means connected to the first said movable contact, an operating rod connected to said lever means and movable longitudinally of the arc-extinguishing unit, and means for moving the operating rod in a direction longitudinally of the arc-extinguishing unit and toward the other end of the unit during the closing operation.

13. A circuit interrupter including an arc-extinguishing unit, a movable contact movable adjacent one end of the unit, an operating rod for actuating said contact movable longitudinally of the unit, a movable disconnect contact movable adjacent the other end of the unit, an actuating lever mounted intermediate the ends thereof on a relatively stationary pivot, the operating rod being connected to one end of the actuating lever, means for operating said movable disconnect contact, and said means engaging the other end of the actuating lever during at least a part of the closing operation to effect longitudinal motion of the operating rod and hence closing motion of the movable contact.

14. A circuit interrupter including an arc-extinguishing unit, a movable contact movable adjacent one end of the unit, lever means connected to said movable contact, an operating rod connected to said lever means for actuating said contact movable longitudinally of the unit, a movable disconnect contact movable adjacent the other end of the unit, an actuating lever mounted intermediate the ends thereof on a relatively stationary pivot, the operating rod being connected to one end of the actuating lever, means for operating said movable disconnect contact, and said means engaging the other end of the actuating lever during at least a part of the closing operation to effect longitudinal motion of the operating rod and hence closing motion of the movable contact.

15. A circuit interrupter including an arc-extinguishing unit, a movable contact movable adjacent one end of the unit, lever means pivotally mounted adjacent one end thereof to a relatively stationary pivot and connected to said movable contact adjacent the other end thereof, a second movable contact movable against the other end of the unit, an operating lever pivotally mounted intermediate the ends thereof adjacent said other end of the unit, the second movable contact being connected to an end of the operating lever, a longitudinally-extending operating rod movable logitutdinally of the unit and connected to the other end of the operating lever, the operating rod also being connected to said lever means intermediate the ends thereof so that motion of the operating rod toward the other end of the unit effects closing motion of both movable contacts.

16. A circuit interrupter including an arc-extinguishing unit, a movable contact, piston structure including a movable piston, means biasing the movable piston in a working direction.

a piston rod, an operating lever pivotally mounted adjacent one end thereof to a substantially fixed pivot and connected to the movable contact adjacent the other end thereof, an actuating lever pivotally mounted intermediate the ends thereof to a substantially stationary pivot and connected adjacent one end thereof to the piston rod, and operating means connected with both the actuating lever adjacent the other end thereof and also to the operating lever intermediate the ends thereof so as to effect simultaneous motion of both the movable contact and the piston structure.

17. A circuit interrupter including an arc-extinguishing unit, a movable contact movable adjacent one end of the unit, an operating rod for actuating said contact movable longitudinally of the unit, a movable contact movable adjacent the other end of the unit, an operating mechanism including a rotatable operating lever, the operating lever being rotatable about a substantially fixed pivot adjacent one end thereof, means for operating the second said movable contact by rotation of said operating lever, an actuating lever, means connecting the operating rod with the actuating lever so as to constantly move therewith, and means secured to and movable with the operating lever to cause rotation of the actuating lever during the closing operation.

18. A circuit interrupter including an arc-extinguishing unit, a movable contact movable adjacent one end of the unit, an operating rod for actuating said contact movable longitudinally of the unit, a movable contact movable adjacent the other end of the unit, an operating mechanism including a rotatable operating lever, the operating lever being rotatable about a substantially fixed pivot adjacent one end thereof, means for actuating the second said movable contact by rotation of said operating lever, an actuating lever, means connecting the operating rod with the actuating lever so as to constantly move therewith, and means secured to and movable with the operating lever and making separable connection to the actuating lever to cause rotation of the latter at least during a portion of the closing operation.

19. A circuit interrupter including an arc extinguishing unit, a movable contact movable adjacent one end of the unit, an operating rod for actuating said contact movable longitudinally of the unit, a movable contact movable adjacent the other end of the unit, an actuating lever mounted intermediate the ends thereof on a relatively stationary pivot, the operating rod being connected to one end of the actuating lever, means for operating said second movable contact, and said means engaging the other end of the actuating lever during at least a part of the closing operation to effect longitudinal motion of the operating rod and hence closing motion of the movable contact.

20. A circuit interrupter including an arc extinguishing unit, a movable contact movable adjacent one end of the unit, lever means connected to said movable contact, an operating rod connected to said lever means for actuating said contact movable longitudinally of the unit, a second movable contact movable adjacent the other end of the unit, an actuating lever mounted intermediate the ends thereof on a relatively stationary pivot, the operating rod being connected to one end of the actuating lever, means for operating said second movable contact, and said means engaging the other end of the actuating lever during at least a part of the closing operation to effect longitudinal motion of the operating rod and hence closing motion of the movable contact.

21. A circuit interrupter including an arc extinguishing unit, a movable contact movable adjacent one end of the unit, an operating rod for actuating said movable contact movable longitudinally of the unit, a second movable contact movable adjacent the other end of the unit, an operating mechanism including a rotatable toggle plate, means interconnecting the second movable contact with the toggle plate, a rotatable actuating plate, means connecting the operating rod with the actuating plate, and an actuating lever pivotally mounted upon the toggle plate to effect rotation of the actuating plate.

JOHN B. MacNEILL.
WINTHROP M. LEEDS.
BENJAMIN P. BAKER.

References Cited in the file of this patent

UNITED STATES PATENTS

| Number | Name | Date |
|---|---|---|
| 1,123,870 | Haskins | Jan. 5, 1915 |
| 2,102,768 | Trencham et al. | Dec. 21, 1937 |
| 2,201,881 | Bryant et al. | May 21, 1940 |
| 2,467,760 | Ludwig et al. | Apr. 19, 1949 |
| 2,477,788 | Cumming | Aug. 2, 1949 |
| 2,495,192 | Webb | Jan. 17, 1950 |

FOREIGN PATENTS

| Number | Country | Date |
|---|---|---|
| 500,731 | Great Britain | Feb. 13, 1939 |